(12) United States Patent
Christopher

(10) Patent No.: US 6,738,914 B2
(45) Date of Patent: May 18, 2004

(54) METHOD AND APPARATUS FOR DETERMINING WHETHER TO WAKE UP A SYSTEM BY DETECTING A STATUS OF A PUSH BUTTON SWITCH THAT IS REMOTELY LOCATED FROM THE SYSTEM

(75) Inventor: Gary L. Christopher, Fox River Grove, IL (US)

(73) Assignee: Motorola, Inc., Schaumburg, IL (US)

(*) Notice: Subject to any disclaimer, the term of this patent is extended or adjusted under 35 U.S.C. 154(b) by 553 days.

(21) Appl. No.: 09/755,322

(22) Filed: Jan. 5, 2001

(65) Prior Publication Data

US 2002/0091955 A1 Jul. 11, 2002

(51) Int. Cl.[7] .................................................. G06F 1/32
(52) U.S. Cl. ........................ 713/323; 713/300; 713/320
(58) Field of Search ................................ 713/300, 320, 713/323, 324

(56) References Cited

U.S. PATENT DOCUMENTS 6,125,449 A * 9/2000 Taylor et al. ............... 713/310
6,393,573 B1 * 5/2002 Gillespie et al. ............ 713/324

FOREIGN PATENT DOCUMENTS

JP          11215697 A   *   8/1999   .............. H02J/1/00

* cited by examiner

*Primary Examiner*—Thomas Lee
*Assistant Examiner*—Paul Yanchus, III (57) ABSTRACT

A communication system (100) includes a control unit (101) electronically coupled to a pushbutton switch (129). The control unit (101) includes a wake-up circuit (110) having a signal generator (201) and a signal detector (202). The signal generator (201) generates a digital pulse signal (139) having a predetermined amplitude (303) and a predetermined duration (304) for receipt by the pushbutton switch (129). The signal detector (202) monitors the digital pulse signal (139) to determine whether the pushbutton switch (129) is actuated or not actuated. The communications system (100) maintains a low power consumption mode responsive to determining when the pushbutton switch (129) is not actuated, and enables a normal power consumption mode responsive to determining when the pushbutton switch (129) is actuated.

18 Claims, 5 Drawing Sheets

FIG.3 TIMING DIAGRAM 300

FIG.4

FIG.5   SIGNAL GENERATOR 201

METHOD AND APPARATUS FOR DETERMINING WHETHER TO WAKE UP A SYSTEM BY DETECTING A STATUS OF A PUSH BUTTON SWITCH THAT IS REMOTELY LOCATED FROM THE SYSTEM

FIELD OF THE INVENTION

The present invention relates generally to electronic systems having a standby mode to minimize current drain, and more particularly to a wake-up circuit for an electronic system and method therefor for use in telematics communication system.

BACKGROUND OF THE INVENTION

Mobile or portable electronic systems, such as a telematics communication system, are typically powered by a portable power supply, such as a battery in an automotive vehicle, and have full functionality in a normal operating mode. Such electronic systems commonly have a standby mode to minimize current drain on the battery when the electronic system is turned on but not requiring the full functionality in the normal operating mode. Hence, the standby mode permits low power or current consumption to support reduced or minimum functionality of the electronic system while the normal operating mode permits normal operating power or current consumption to support full functionality of the electronic system. Typically, an electronic system has a normal mode power supply to provide power to the electronic system when operating in the normal operating mode and a separate standby mode power supply to provide power to the electronic system when operating in the standby mode.

An electronic system is known to "wake-up" when the electronic system changes from the standby mode to the normal operating mode responsive to a wake-up signal. A wake-up signal may be generated when a user activates a switch, such as a pushbutton or a key. In some electronic systems it is important that the electronic system wake-up almost instantaneously to give an impression to a user that the electronic system was always in the normal operating mode and to instantaneously provide the full functionality associated with the normal operating mode.

When the pushbutton is used as the switch to generate the wake-up signal, a relatively high level of current must pass through its conductive contacts to overcome or break through any electrical resistance caused by contamination or oxidation that may be present on the conductive contacts.

Further, when the pushbutton is located at a remote position relative to control circuitry of the electronic system and electrically coupled to the control circuitry of the electronic system using a wire, then the electronic system must be able to determine the electrical state of the switch or the wire indicating a failure thereof. The detection of the electrical state-of the switch or the wire is especially needed when the pushbutton serves a critical function, such as an emergency call button in the telematics communication system.

One known technique for the processor to determine the electrical state of the switch is using a resistor-based circuit. In this case, a resistor is connected in parallel with a switch. A first terminal of the resistor is connected to ground. A second terminal of the resistor is connected to a direct current (DC) voltage. An analog to digital (A/D) input port to the processor monitors the DC voltage at the second terminal of the resistor. The processor interprets a low voltage (e.g., 0 V) at the A/D input port as an active state, wherein the switch is pressed or closed. The processor interprets a mid voltage (e.g., 2.5 V) at the A/D input port as an idle state, wherein the switch is not pressed or open. The processor interprets a high voltage (e.g., 5 V) at the A/D input port as a failure state, wherein a wire connecting the switch to the processor is broken or open. However, there are several disadvantages of the resistor-based circuit. The resistor-based circuit is relatively complex and therefore, relatively expensive to implement. The resistor-based circuit draws a steady amount of current that drains a battery power supply such that the switch practically can only be used when the electrical system is turned on, since the standby current drain is too high. Further, the resistor-based circuit cannot detect a short circuit state, wherein the switch is stuck in a closed position.

Accordingly, there is a need for a wake-up circuit for an electronic system and method therefor that uses a minimum amount of current while the electrical system is in the standby mode, that delivers a relatively high level of current to the switch during wake-up, and that determines the electrical state of the switch or the wire in the remotely positioned switch or in the wire leading to the remotely positioned switch.

DETAILED DESCRIPTION OF A PREFERRED EMBODIMENT

Figure 1:
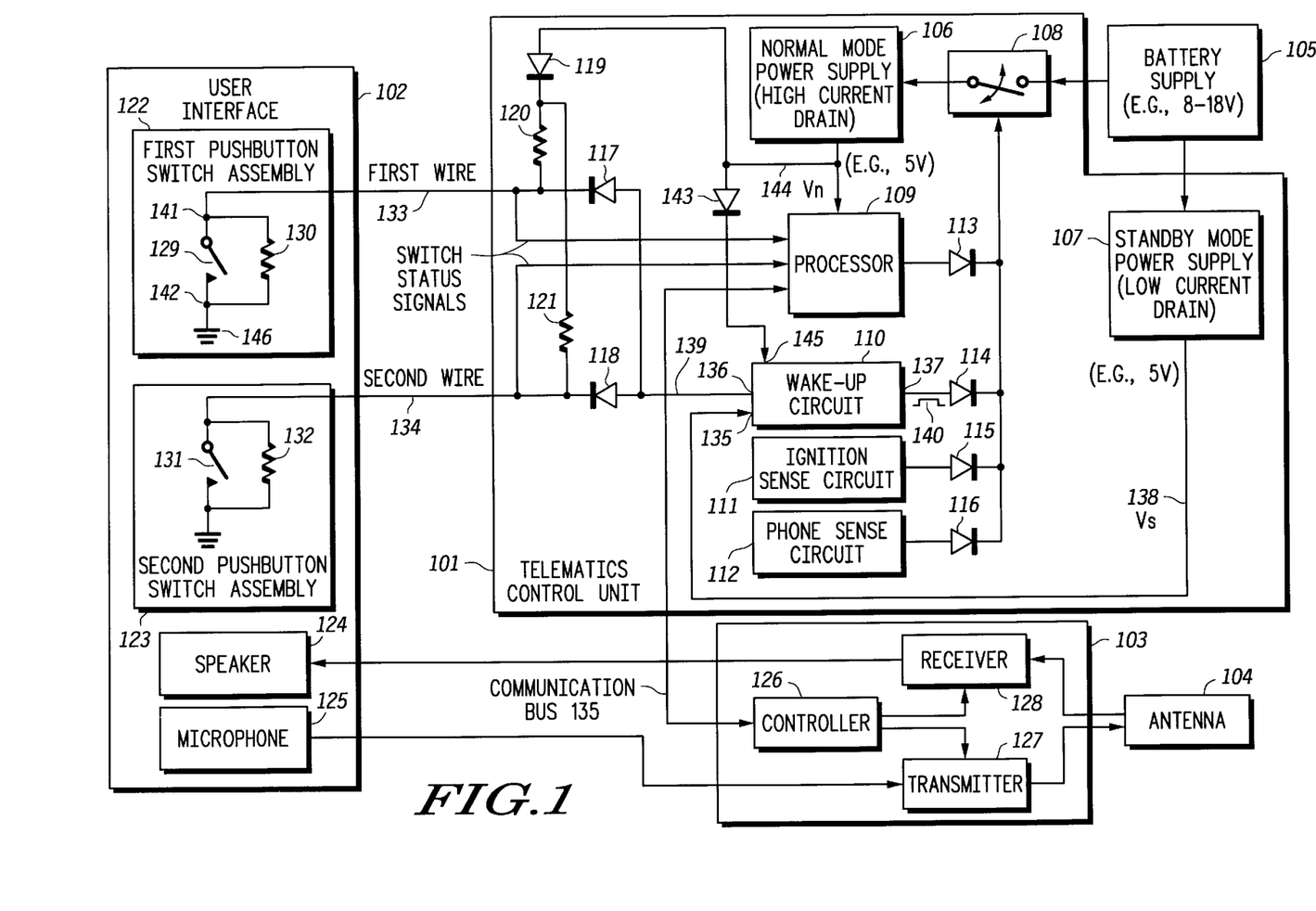
FIG. 1 illustrates a block diagram of a telematics communication system, installed in an automotive vehicle, including a wake-up circuit, in accordance with a preferred embodiment of the present invention.

FIG. 1 illustrates a block diagram of a telematics communication system 100, installed in an automotive vehicle, including a wake-up circuit 110, in accordance with a preferred embodiment of the present invention. The automotive vehicle generally includes the telematics communication system 100. The automotive vehicle is preferably a car or a truck, but may be any land, air or water traveled vehicle. Other automotive vehicles include, without limitation, a plane, a boat, a train, a motorcycle, and the like. The telematics communication system 100 generally includes a telematics control unit 101, a user interface 102, a transceiver 103 and an antenna 104.

The transceiver 103 and the telematics control unit 101 are typically integrated into one housing and is typically provided by a cellular telephone manufacturer for installation in a discrete location, such as in a trunk, in a dashboard, or under a seat in a car or truck. Alternatively, the telematics control unit 101 may be in a housing separate from the transceiver 103 and provided by an automotive vehicle manufacturer. Further, automotive design engineers or installation technicians install or integrate the user interface 102 in a discrete location, such as into a dashboard, steering wheel, sun visor or the like of a car or truck. Likewise, automotive design engineers or installation technicians typically install the antenna 104 at a remote position relative to the transceiver 103, such as integrated with a vehicle's entertainment system antenna, integrated with glass (as in a front wind shield), or mounted on a roof of a vehicle.

The telematics control unit 101 is a robust unit well suited to the harsh automotive environment. The telematics control unit 101, which communicates with a central service center (not shown) via the transceiver 103, serves as a central platform where all telematics related technologies are integrated. The telematics control unit 101 communicates location specific information to the central service center and, in turn, the central service center delivers telematics services to a person in the automotive vehicle via the telematics control unit 101. Telematics services include dispatching emergency services, sending roadside assistance, delivering navigation assistance and providing real-time traffic information, among others. The telematics control unit 101 can be connected to an engine control unit (i.e., the on-board computer, not shown) that enables an enhanced service such as remote engine diagnostics.

In addition to the telematics control unit 101, the telematics communication system 100 also includes unique software for various components in the telematics communication system 100. Each component is programmed with software to allow various portions of the telematics communication system 100 to operate as if they were integrated together. For example, software allows a global positioning satellite (GPS) receiver (not shown) and the telematics control unit 101 to interact with one another to relay location information to the central service center, thereby enabling a rendering of services to the automotive vehicle. Other software permits delivery of even more sophisticated communications, including Internet access, information and entertainment on demand, Email, and interaction with e-commerce sites.

Applications for the telematics communication system 100 include: automatic emergency call and response upon airbag deployment, driving directions responsive to a driver's current location, roadside assistance that pinpoints a disabled vehicle, remote control of vehicle's electrical functions such as locking or unlocking doors and stolen vehicle tracking, readily available customer assistance, synchronizing with personal digital assistant (PDA) devices to allow out-of-office information downloads, enhanced service center and network supporting "car meetings" and other tasks, incorporation of real-time traffic information to enhance navigation effectiveness, remote vehicle diagnostics, development of a personal area network permitting seamless integration of the automotive vehicle with other communication and computing platforms including automatic handoff between a hands-free vehicle phone and a portable handset and wireless updates of all calendars, contact lists, etc., synchronization with local merchants and service providers for "push" information and e-commerce, secure access to private data networks, including office e-mail systems, customized information and entertainment on demand including news, financials, weather, sports, audio books, music and games, and over-the-air reprogramming of on-board computer.

The automotive vehicle further includes a battery supply 105 providing a voltage supply to the telematics communication system 100. The telematics control unit 101 further includes a normal mode power supply 106, a standby mode power supply 107, a switch 108, a processor 109, a wake-up circuit 110, an ignition sense circuit 111, a phone sense circuit 112, wake-up isolation diodes 113–116, pushbutton switch isolation diodes 117–118, power supply isolation diodes 119 and 143, a first pull up resistor 120 and a second pull up resistor 121. The user interface 102 further includes a first pushbutton switch assembly 122, a second pushbutton switch assembly 123, a speaker 124 and a microphone 125. The transceiver 103 further includes a controller 126, a transmitter 127 and a receiver 128. The first pushbutton switch assembly 122 further includes a first pushbutton switch 129 and a resistor 130. The second pushbutton switch assembly 123 further includes a second pushbutton switch 131 and a resistor 132.

The telematics control unit 101 is electrically coupled to the first pushbutton switch assembly 122 via a first wire 133, and electrically coupled to the second pushbutton switch assembly 123 via a second wire 134. The telematics control unit 101 is also electrically coupled to the transceiver 103 via a communications bus 135.

The wake-up circuit 110 generally has a first input terminal 135, a second input terminal 136, a third input terminal 145, a first output terminal 136, and a second output terminal 137. The first input terminal 135 of the wake-up circuit 110 is adapted to receive a voltage 138 from the standby mode power supply 107. The second input terminal 136 of the wake-up circuit 110 is adapted to receive a switch signal 139 from the first pushbutton switch 129 or the second pushbutton switch 131. The third input terminal 145 of the wake-up circuit 110 is adapted to receive a voltage 144 from the normal mode power supply 107. The first output terminal 136 of the wake-up circuit 110 is adapted to generate a digital pulse signal 139. The second output terminal 137 of the wake-up circuit 110 is adapted to generate a wake-up signal 140.

In a standby mode having the low consumption mode, the telematics communication system 100 operates as follows. The switch 108 is open, thereby preventing any voltage from the battery supply 105 from reaching the normal mode power supply 106. Therefore, the normal mode power supply 106 is turned off thereby generating a voltage 144 of 0 V. A voltage 144 of 0 V causes the second terminal 141 of the first pushbutton switch 129 to also be at 0 V. The resistor 130 has the voltage 144 of 0 V at one terminal and the ground potential 146 at the other terminal. Therefore, the resistor 130 provides no voltage drop corresponding to no current drain, due to the normal mode power supply 106.

The wake-up circuit 110 generates a digital pulse signal 139 having a low duty cycle to strobe the first pushbutton switch assembly 122 and the second pushbutton switch assembly 123. The digital pulse signal 139 generates the high voltage of the digital pulse signal 139 for only a small amount of time when compared to when the digital pulse signal 139 generates the low voltage of the digital pulse signal 139 to produce the low duty cycle. When the digital pulse signal 139 generates a high voltage (e.g., 5 V), then a voltage drop is generated across each of the resistors 130 and 132 to generate current drain. When the digital pulse signal 139 generates a low voltage (e.g., 0 V), then no voltage drop appears across each of the resistors 130 and 132 resulting in no current drain. Because the digital pulse signal 139 has a low duty cycle, the current drain is very small, such as, for example and without limitation, in the 5 microampere range.

Further details related to how the wake-up circuit 110 operates to result in the telematics communication system 100 having a very low current drain in the standby mode is described with reference to the remaining figures.

When a passenger of the automotive vehicle pushes one of the pushbutton switches 129 or 131, the digital pulse signal 139 is momentarily shorted to the ground potential 146. The wake-up circuit 110 detects that the digital pulse signal 139 is momentarily shorted to the ground potential 146 and generates a wake-up signal 140. Other sensing circuits such as the ignition sense circuit 111 and the phone sense circuit 112 may also generate the wake-up signals, as is well known in the art. The wake-up isolation diodes 113–116 prevents a wake-up signal from its respective sense circuit from interfering with the other sensing circuits, as is well known in the art.

The wake-up signal 140 causes the switch 108 to close for the duration of the wake-up signal 140, thereby causing the battery supply 105 to be electrically coupled to the normal mode power supply 106. Upon receiving voltage from the battery supply 105, the normal mode power supply 106 turns on, thereby generating a voltage 144, such as, for example and without limitation a high voltage of 5 V. The high voltage 144 causes the processor 109 to wake-up by turning on. When the processor 109 wakes up, the processor 109 generates a wake-up signal that keeps the switch 108 closed. Hence, the wake-up signal 140 stays high long enough for the normal mode power supply 106 and the processor 109 to wake-up, stay turned on, and to keep the switch 108 into its closed state. Sometimes, the operation of using the wake-up signal 140 as a trigger signal causing the normal mode power supply 106 and the processor 109 to wake-up, stay turned on, and to keep the switch 108 into its closed state is known as a latch circuit because the switch 108 is latched closed by processor 109.

Turning on the normal mode power supply 106 also provides a voltage 144 at the high level (5 V) to the input terminal 145 of the wake-up circuit 110. The voltage 144 at the high level causes the wake-up circuit 110 to stop generating the digital pulse signal 139. The generation of the digital pulse signal 139 is stopped while the normal mode power supply is turned on to prevent the generating of noise that may be generated due to the digital pulse signal 139 while the telematics communication system 100 is operating in the normal operating mode with full functionality.

When the processor 109 determines that the telematics communication system 100 should transition from the normal operating mode to the standby mode, the processor 109 stops generating the wake-up signal, which, in turn, causes the switch 108 to open. When the switch 108 opens, voltage from battery supply 105 is cut off from the normal mode power supply 106. When the normal mode power supply 106 looses its supply voltage, the output voltage 144 of the normal mode power supply 106 drops to 0 V, thereby removing the voltage supply to the processor 109 and the wake-up circuit 110. The processor 109 shuts down responsive to loosing its supply voltage. The wake-up circuit 110 receives at the input terminal 145 the change in the output voltage 144 of the normal mode power supply 106 from the high voltage of 5 V to the low voltage of 0 V. The change in the output voltage 144 to the low voltage of 0 V causes the wake-up circuit 110 to again start generating the digital pulse signal 139, thereby providing a low current wake-up system for the pushbutton switches 129 and 131 when the telematics communication system 100 is in the standby mode of operation.

In operation, the power supply isolation diodes 119 and 143 isolate the output voltage 144 of the normal mode power supply 106 from being affected by signals generated by the pushbutton switch assemblies 122 and 123 or the wake-up circuit 110, as is well known in the art.

In operation, the pushbutton switch isolation diodes 117-118 isolate signals generated by each of the pushbutton switch assemblies 122 and 123 so that the processor 109 can determine which pushbutton switch 129 or 131 is pressed, as is well known in the art.

In operation, the first pull up resistor 120 and the second pull up resistor 121 provide resistor divider circuits with the corresponding resistors 130 and 132 in the pushbutton switch assemblies 122 and 123, as is well known in the art. The resistor divider circuits provide an appropriate voltage at the pushbutton switches 129 and 131 to permit the processor 109 to determine the electrical state of the pushbutton switches 129 and 131, as is well known in the art.

In operation, the transceiver 103, the antenna 104, the speaker 124 and the microphone 125 function as a radio frequency device, such as, by example and without limitation, a cellular telephone, as is well known in the art. In the preferred embodiment of the present invention, the transceiver 103 transmits a signal to the remote service center via the antenna 104 when a passenger of the automotive vehicle presses the first pushbutton switch 129 or the second pushbutton switch 131, as is well known in the art.

In summary, the block diagram and corresponding function of telematics communication system 100, as shown in FIG. 1, is generally well known in the art, with the exception of the wake-up circuit 110. The present invention relates to the wake-up circuit 110 that is described in further detail with reference to FIGS. 2–4.

Figure 2:
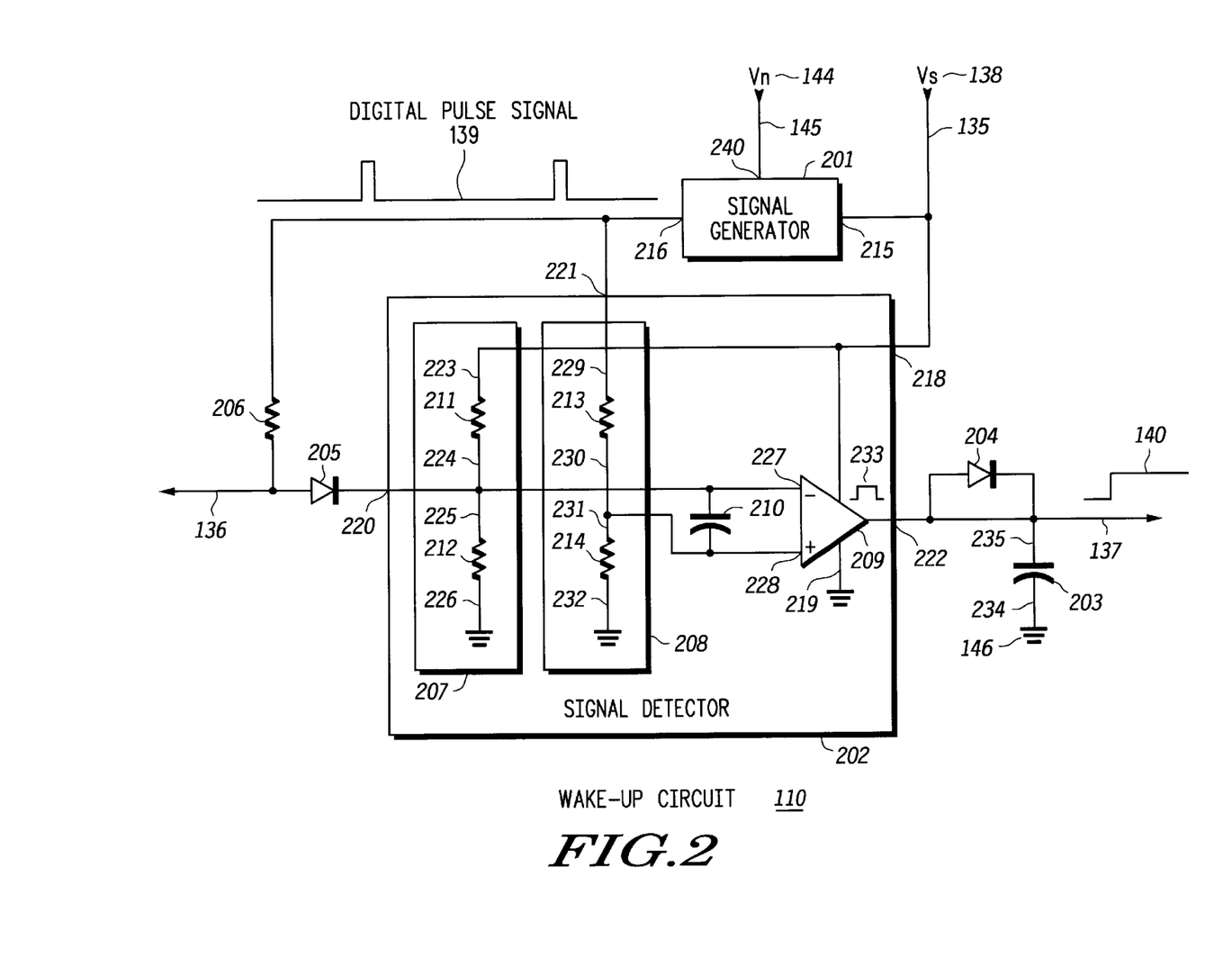
FIG. 2 illustrates a schematic diagram of the wake-up circuit, as illustrated in FIG. 1, including a signal generator and a comparator, in accordance with a preferred embodiment of the present invention.
Figure 3:
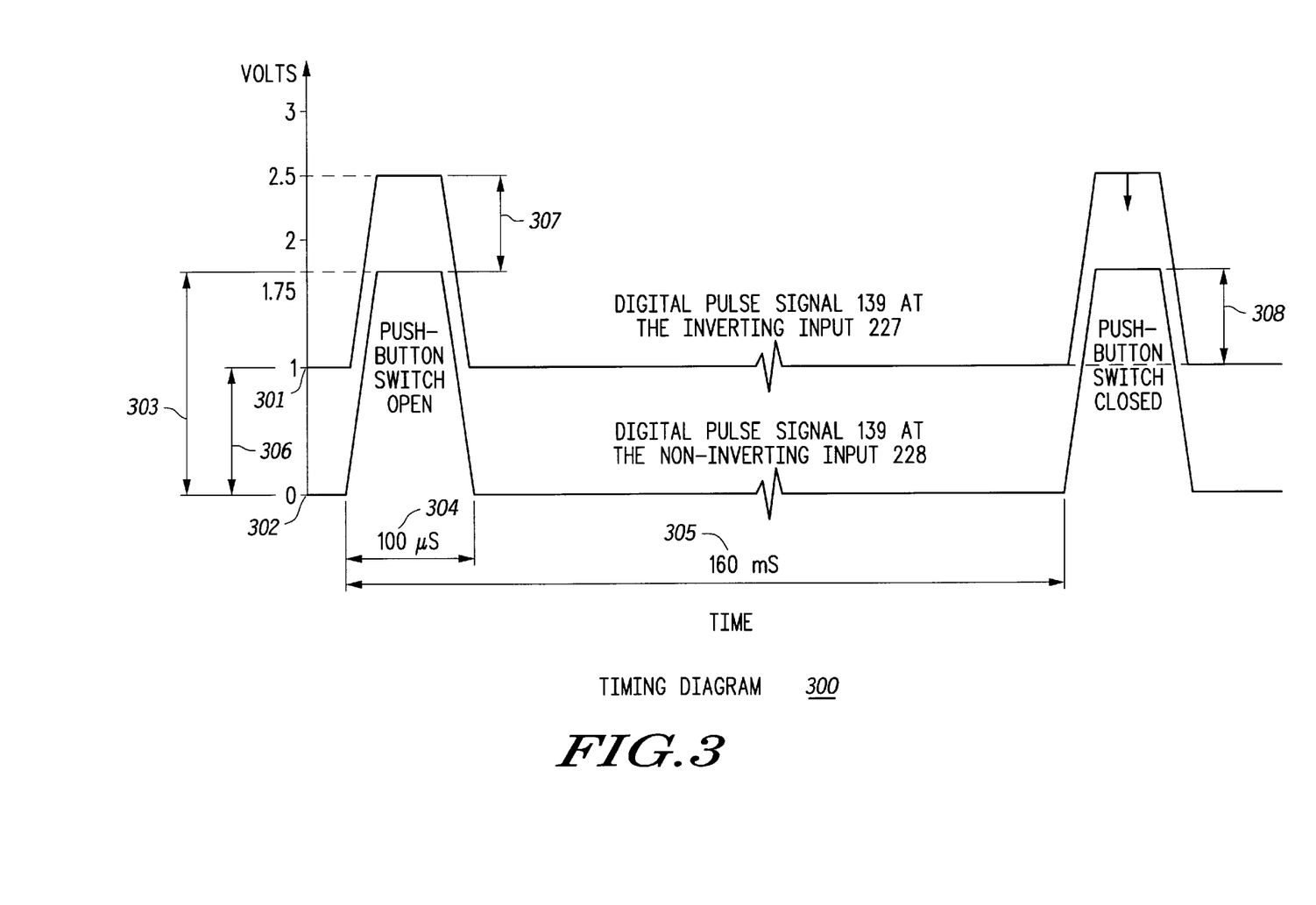
FIG. 3 illustrates a timing diagram for the wake-up circuit 110, as illustrated in FIG. 2, including digital pulse signals present at a first input and a second input to the comparator, in accordance with a preferred embodiment of the present invention.

Next, FIGS. 2 and 3 are described together. FIG. 2 illustrates a schematic diagram of the wake-up circuit 110, as illustrated in FIG. 1, including a signal generator and a comparator 209, in accordance with a preferred embodiment of the present invention. FIG. 3 illustrates a timing diagram 300 for the wake-up circuit 110, as illustrated in FIG. 2, including digital pulse signals present at a first input and a second input to the comparator 209.

The wake-up circuit 110 further includes a signal generator 201, a signal detector 202, a pulse signal lengthening capacitor 203, a pulse signal isolation diode 204, a signal generator isolation diode 205, and a current limiting resistor 206. The signal detector 202 further includes a first bias circuit 207, a second bias circuit 208, a comparator 209 and a noise reduction capacitor 210. The first bias circuit 207 further includes a first resistor 211 and a second resistor 212. The second bias circuit 208 further includes a first resistor 213 and a second resistor 214.

The signal generator 201 has a first input terminal 215, a second input 240 and an output terminal 216. The first input terminal 215 of the signal generator 201 is the same terminal as the input terminal 135 of the wake-up circuit 110. The input terminal 240 of the signal generator 201 is the same terminal as the input terminal 145 of the wake-up circuit 110. The signal generator 201 is adapted to receive at the input terminal 215 a voltage 138 from the standby mode power supply 107. The signal generator 201 is adapted to receive at the input terminal 240 a voltage 144 from the normal mode power supply 106. The output terminal 216 of the signal generator 201 is adapted to generate the digital pulse signal 139 having a predetermined amplitude 303 (FIG. 3) and a predetermined duration 304 (FIG. 3). The output terminal 216 of the signal generator 201 is electrically coupled to a first terminal 141 of the first pushbutton switch 129 having a second terminal 142 electrically coupled to a ground potential.

In the preferred embodiment of the present invention, the digital pulse signal 139 has a predetermined amplitude 303 of 5 V and a predetermined duration 304 of 100 microseconds. Further, the digital pulse signal 139 preferably has a time duration between like edges of successive pulses 305 (FIG. 3) of 160 milliseconds. Hence, in the preferred embodiment of the present invention, the digital pulse signal 139 is turned on or present for only 100 microseconds out of every 160 milliseconds to provide a duty cycle of 0.063%. This ultra-low duty cycle advantageously reduces the current drain due to the pushbutton switch assemblies 122 and 123 of the telematics communication system 100 by a significant amount over the conventional steady current drain resistor method of monitoring pushbutton switch assemblies. For example, if the conventional steady current drain resistor method of monitoring pushbutton switch assemblies consumes a standby current of 10 milliamps, then the telematics communication system 100 having the wake-up circuit of the preferred embodiment of the present invention consumes 6.25 microamps (10 milliamps× 0.063%). This ultra low current drain advantageously permits the pushbutton switch assemblies 122 and 123 to be in the standby mode for a longer period of time without significantly reducing the voltage on the battery supply 105.

The signal detector has a power supply terminal 218, a ground terminal 219, a first input terminal 220, a second input terminal 221 and an output terminal 222. The power supply terminal 218 is adapted to receive voltage 138 from the standby mode power supply 107. The ground terminal 219 is adapted to be electrically coupled to the ground potential 146. Each of the first input terminal 220 and the second input terminal 221 of the signal detector 202 are adapted to receive the digital pulse signal 139. One of the first input terminal 220 and the second input terminal 221 of the signal detector 202 is electrically coupled to the first terminal 141 of the first pushbutton switch 129.

The first bias circuit 207 is electrically coupled to the first input terminal 220 of the signal detector 202 and adapted to bias the digital pulse signal 139 at a first predetermined direct current (DC) level 301. In the preferred embodiment of the present invention, the first predetermined DC level 301 is 1.0 V.

In the preferred embodiment of the present invention, the first bias circuit 207 is implemented as the first resistor divider circuit having the first resistor 211 and the second resistor 212. Each of the first resistor 211 and the second resistor 212 of the first bias circuit 207 has a first terminal and a second terminal. The first terminal 223 of the first resistor 211 is electrically coupled to the standby mode power supply 107. The second terminal 224 of the first resistor 211 is electrically coupled to the first terminal 225 of the second resistor 212 and electrically coupled to a first input terminal 227 of the comparator 209. The second terminal 226 of the second resistor 212 is electrically coupled to the ground potential 146.

The second bias circuit 208 is electrically coupled to the second input terminal 221 of the signal detector 202 and adapted to bias the digital pulse signal 139 at a second predetermined DC level 302, different from the first predetermined DC level 301. In the preferred embodiment of the present invention, the first predetermined DC level is 0 V. In the preferred embodiment of the present invention, the first predetermined DC level 301 is higher than the second predetermined DC level 302. Alternatively, the first predetermined DC level 301 may be made lower than the second predetermined DC level 302 depending on application specific or design specific criterion.

In the preferred embodiment of the present invention, the second bias circuit 208 is implemented as the second resistor divider circuit having a third resistor 213 and a fourth resistor 214. Each of the third resistor 213 and the fourth resistor 214 of the second bias circuit 208 has a first terminal and a second terminal. The first terminal 229 of the third resistor 213 is electrically coupled to the output terminal 216 of the signal generator 201. The second terminal 230 of the third resistor 213 is electrically coupled to the first terminal 231 of the fourth resistor 214 and electrically coupled to a second input terminal 228 of the comparator 209. The second terminal 232 of the fourth resistor 214 is electrically coupled to the ground potential 146.

In the preferred embodiment of the present invention, a DC difference 306 between the first predetermined DC level 301 and the second predetermined DC level 302 is less than the predetermined amplitude 303 of the digital pulse signal 139 electrically coupled to the one of the first input terminal and the second input terminal of the signal detector 202 that is not electrically coupled to the first terminal 141 of the pushbutton switch 129. In the preferred embodiment of the present invention, the difference 306 is 1.0 V which is less than the predetermined amplitude 303 of the digital pulse signal 139 electrically coupled to the first input terminal 221 of the signal detector 202 that is not electrically coupled to the first terminal 141 of the pushbutton switch 129. More particularly, the predetermined amplitude 303 of the digital pulse signal 139 at the input 128 to the comparator 209, that is not electrically coupled to the first terminal 141 of the pushbutton switch 129, has a voltage of 1.75 V. Hence, there is a 0.75 V overlap (1.75 V–1.0 V).

In the preferred embodiment of the present invention, a first difference 307 exists between the predetermined amplitude 303 of a first one of the digital pulse signal 139 received at the first terminal 227 of the comparator 209 and the digital pulse signal 139 received at the second terminal 228 of the comparator and the predetermined amplitude 303 of a second different one of the digital pulse signal 139 received at the first terminal 227 of the signal detector 209 and the digital pulse signal 139 received at the second terminal 228 of the comparator 228 responsive to the pushbutton switch 129 or 131 not being actuated. Preferably, the first difference 307 is a positive difference because the digital pulse signal 139 at the inverting input terminal 227 of the comparator 209 is biased at a higher DC voltage level than the digital pulse signal 139 at the non-inverting input terminal 228 of the comparator 209. Hence, when the pushbutton switch 129 or 131 is not actuated the digital pulse signal 139 at each of the inverting input terminal 228 and the inverting input terminal 227 of the comparator 209 tracks each other in a nested fashion without any overlap between the two signals.

In the preferred embodiment of the present invention, a second difference 308 exists between the predetermined amplitude 303 the first one of the digital pulse signal 139 received at the first terminal 227 of the comparator 209 and the digital pulse signal 139 received at the second terminal 228 of the comparator 209 and the predetermined amplitude 303 of the second different one of the digital pulse signal 139 received at the first terminal 227 of the comparator 209 and the digital pulse signal 139 received at the second terminal 228 of the comparator 209 responsive to the pushbutton switch 129 or 131 being actuated. Preferably, the second difference 308 is a negative difference because the digital pulse signal 139 at the inverting input terminal 227 of the comparator 209 is biased at a higher DC voltage level than the digital pulse signal 139 at the non-inverting input terminal 228 of the comparator 209. Hence, when the pushbutton switch 129 or 131 is actuated, the digital pulse signal 139 at the inverting input terminal 228 is pulled to the first predetermined DC level 301 by the pushbutton switch 129 or 131 shorting to the ground potential. This action causes the digital pulse signal 139 at the inverting input terminal 228 of the comparator 209 to drop below the digital pulse signal 139 at the inverting input terminal 228 of the comparator 209 to cause an overlap between the two signals. Preferably, the overlap is 0.75 V (1.75 V–1.0 V).

The first difference 307 and the second difference 308 between the digital pulse signal 139 at the inverting input terminal 228 of the comparator 209 and the digital pulse signal 139 at the inverting input terminal 228 of the comparator 209 is determined by design to provide adequate noise immunity, to reduce signal misinterpretation, and to provide a positive indication of switch actuation.

Preferably, the predetermined amplitude of the digital pulse signal 139 at the inverting input terminal 228 of the comparator 209 (e.g., 1.5 V) is less than the predetermined amplitude of the digital pulse signal 139 at the inverting input terminal 228 of the comparator 209 (e.g., 1.75 V). Alternatively, the predetermined amplitudes of the two signals may be the same.

In the preferred embodiment of the present invention, the comparator generates an output signal 233 having a first level and a second level, different from the first level. Preferably, the first level is a low voltage level, such a 0 V, and the second voltage level is a high voltage level, such as 5 V. The first level of the output signal 233 is generated responsive to the first difference 307 the pushbutton switch 129 or 131 is not actuated causing the telematics communication system 100 to remain in a low power consumption mode. The second level of the output signal 233 is generated responsive to the second difference 308 the pushbutton switch 129 or 131 is actuated causing the telematics communication system 100 to transition from the low power consumption mode to a normal power consumption mode.

In the preferred embodiment of the present invention, the wake-up circuit further includes the pulse lengthening capacitor 203 having a first terminal 234 and a second terminal 235. The first terminal 234 of the pulse lengthening capacitor 203 is electrically coupled to the ground potential 146. The second terminal 235 of the pulse lengthening capacitor 203 is electrically coupled to the output terminal 222 of the comparator 209. The pulse lengthening capacitor 203 is adapted to increase an amount of time that the second level of the output signal 233 is present to provide a lengthened second level of the output signal 233. The lengthened second level of the output signal 233 give the telematics communication system 100, including the normal mode power supply 106 and the processor 109, more time to transition from the low power consumption mode to the normal power consumption mode.

The resistor 206 typically has a low value to permit a high current to pass through the pushbutton switch 129 when the pushbutton switch 129 is actuated. The diode 204 prevents the capacitor 203 from discharging through the comparator 209. The diode 205 prevents the voltage 138 from the standby mode power supply 107 from appearing at the output terminal 216 of the signal generator 201 or from appearing across the resistors 130 and 132 in the pushbutton switch assemblies. The capacitor 210 provides immunity for radio frequency noise.

Preferably, the comparator 209 in the wake-up circuit 110 and the comparator in the signal generator 201 is a National Semiconductor part number LMC7215. This part is a small-scale integrated circuit that has a maximum quiescent current of 1 micro Amp over temperature and is capable of providing 45 milliamps from its totem pole output.

Figure 4:
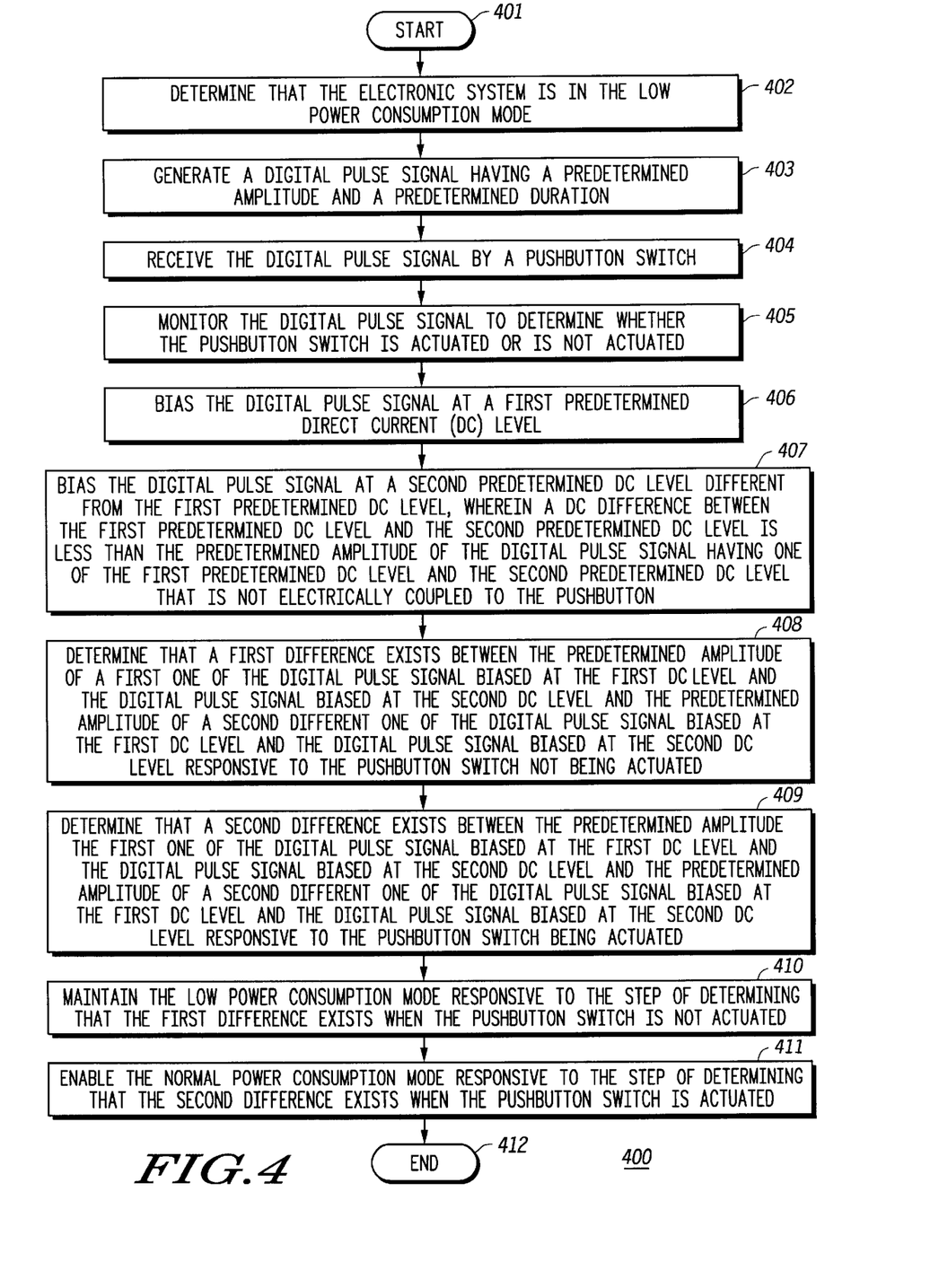
FIG. 4 illustrates a flowchart describing a method performed by the wake-up circuit, as illustrated in FIG. 1, in accordance with a preferred embodiment of the present invention.

FIG. 4 illustrates a flowchart describing a method 400 performed by the wake-up circuit 110, as illustrated in FIG. 1, in accordance with a preferred embodiment of the present invention.

At step 401, the method starts.

Figure 5:
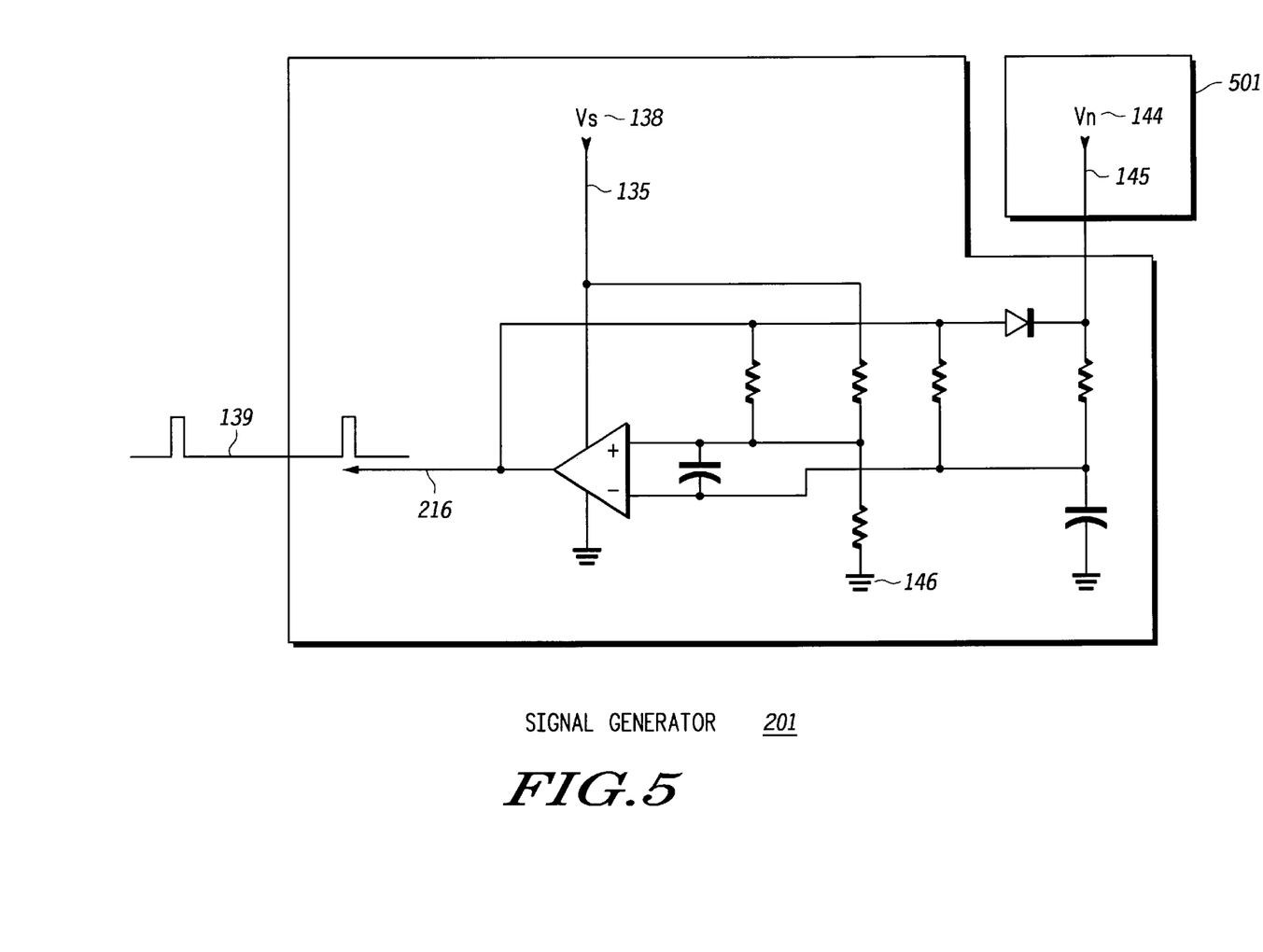
FIG. 5 illustrates a schematic diagram of the signal generator, as illustrated in FIG. 2, in accordance with a preferred embodiment of the present invention.

At step 402, the wake-up circuit 110 determines that the telematics communication system 100 is in the low power consumption mode. The wake-up circuit 110 determines via the normal operating voltage 144 at the input terminal 145. When the normal operating voltage 144 is present at the input terminal 145, the signal generator 201 stops generating the digital pulse signal 139 thereby permitting the telematics communication system 100 to operate in the normal operating power consumption mode. When the normal operating voltage 144 is not present at the input terminal 145, the signal generator 201 starts generating the digital pulse signal 139 thereby permitting the telematics communication system 100 to operate in the low power consumption mode. FIG. 5 describes further details of how the wake-up circuit 110 determines that the telematics communication system 100 is in the low power consumption mode or the normal operating power consumption mode.

At step 403, the wake-up circuit 110 generates a digital pulse signal 139 having the predetermined amplitude 303 and the predetermined duration 304, as described hereinabove.

At step 404, the wake-up circuit 110 and the pushbutton switches 129 and 131 receive the digital pulse signal 139, as described hereinabove.

At step 405, the wake-up circuit 110 monitors the digital pulse signal 139 to determine whether the pushbutton switch 129 is actuated or is not actuated. Step 405 further includes the steps 406–409.

At step 406, the wake-up circuit 110 biases the digital pulse signal 139 at the first predetermined DC level 301, as described hereinabove.

At step 407, the wake-up circuit 110 biases the digital pulse signal 139 at the second predetermined DC level 302 different from the first predetermined DC level 301. The DC difference 306 between the first predetermined DC level 301 and the second predetermined DC level 302 is less than the predetermined amplitude 303 of the digital pulse signal 139 having the first predetermined DC level or the second predetermined DC level that is not electrically coupled to the pushbutton switch.

At step 408, the wake-up circuit 110 determines that a first difference 307 exists between the predetermined amplitude 303 of a first one of the digital pulse signal 139 biased at the first DC level 301 and the digital pulse signal 139 biased at the second DC level 302 and the predetermined amplitude 303 of a second different one of the digital pulse signal 139 biased at the first DC level 301 and the digital pulse signal 139 biased at the second DC level 302 responsive to the pushbutton switch 129 not being actuated.

At step 409, the wake-up circuit 110 determines that a second difference 308 exists between the predetermined amplitude 303 of the first one of the digital pulse signal 139 biased at the first DC level 301 and the digital pulse signal 139 biased at the second DC level 302 and the predetermined amplitude 303 of the second different one of the digital pulse signal 139 biased at the first DC level 301 and the digital pulse signal 139 biased at the second DC level 302 responsive to the pushbutton switch 129 being actuated.

At step 410, the wake-up circuit 110 maintains the low power consumption mode responsive to the step 408 of determining that the first difference 307 exists when the pushbutton switch 129 is not actuated.

At step 411, the wake-up circuit 110 enables the normal power consumption mode responsive to the step 409 of determining that the second difference 308 exists when the pushbutton switch 129 is actuated.

At step 412, the method ends.

FIG. 5 illustrates a schematic diagram of the signal generator 201, as illustrated in FIG. 2, in accordance with a preferred embodiment of the present invention. The signal generator 201 is generally known as a relaxation oscillator, such as for example and without limitation, a 555 timer or a real time clock generator, as is well known in the art. The signal generator 201 generates the digital pulse signal 139 having the predetermined duration, the predetermined amplitude and the predetermined duty cycle according to application specific design requirements. The signal generator 201 receives voltage 138 at the input terminal 135 of the wake-up circuit 110 from the standby mode power supply 107.

A unique feature of the signal generator 201, not known to those skilled in the art, is the normal mode power supply interface 501 to the signal generator 201. The normal mode power supply interface 501 provides the voltage 144 to the signal generator 201 at the input terminal 145 of the wake-up circuit 110. When the normal operating voltage 144 is present at the input terminal 145, the signal generator 201 does not generate the digital pulse signal 139 thereby permitting the telematics communication system 100 to operate in the normal operating power consumption mode. When the normal operating voltage 144 is not present at the input terminal 145, the signal generator 201 generates the digital pulse signal 139 thereby permitting the telematics communication system 100 to operate in the low power consumption mode. The normal mode power supply interface 501 advantageously provides a circuit to turn on and off the signal generator 201 in the wake-up circuit 110 by using the presence or absence of the normal operating voltage 144 thereby eliminating the need for a control signal from another circuit, such as the processor 109. Therefore, the processor 109 is turned off completely when the telematics communication system 100 operates in the low power consumption mode.

In summary of the preferred embodiment of the present invention, the wake-up circuit 110 strobes the pushbutton switches 129 and 131 with the digital pulse signal 139 generated by the signal generator 201. When a passenger of the automotive vehicle presses one of the pushbutton switches 129 and 131, the wake-up circuit 110 detects a negative difference 308 between the digital pulse signals 139 at the inverting input 227 and the non-inverting input 228 of the comparator 209. Responsive to detecting the negative difference 308, the comparator 209 generates a high voltage signal 140 to cause the telematics communication system 100 to transition from the low power consumption mode to the normal power consumption mode.

Hence, while the present invention has been described with reference to various illustrative embodiments thereof, the present invention is not intended that the invention be limited to these specific embodiments. Those skilled in the art will recognize that variations and modifications can be made without departing from the spirit and scope of the invention as set forth in the appended claims.

What is claimed is:

1. A wake-up circuit for an electronic system, comprising:

a signal generator having an output terminal and adapted to generate a digital pulse signal at the output terminal, wherein the digital pulse signal has a predetermined amplitude and a predetermined duration, wherein the output terminal of the signal generator is electrically coupled to a first terminal of a pushbutton switch having a second terminal electrically coupled to a ground potential;

a signal detector having a power supply terminal, a ground terminal, a first input terminal, a second input terminal and an output terminal, wherein the power supply terminal is adapted to receive power from a power supply, wherein the ground terminal is adapted to be electrically coupled to the ground potential, wherein each of the first input terminal and the second input terminal of the signal detector are adapted to receive the digital pulse signal, wherein one of the first input terminal and the second input terminal of the signal detector is electrically coupled to the first terminal of the pushbutton switch, and wherein the signal detector further comprises:

a first bias circuit electrically coupled to the first input terminal of the signal detector and adapted to bias the digital pulse signal at a first predetermined direct current (DC) level; and a second bias circuit electrically coupled to the second input terminal of the signal detector and adapted to bias the digital pulse signal at a second predetermined DC level different from the first predetermined DC level, wherein a DC difference between the first predetermined DC level and the second predetermined DC level is less than the predetermined amplitude of the digital pulse signal electrically coupled to the one of the first input terminal and the second input terminal of the signal detector that is not electrically coupled to the first terminal of the pushbutton switch, wherein a first difference exists between the predetermined amplitude of a first one of the digital pulse signal received at the first terminal of the signal detector and the digital pulse signal received at the second terminal of the signal detector and the predetermined amplitude of a second different one of the digital pulse signal received at the first terminal of the signal detector and the digital pulse signal received at the second terminal of the signal detector responsive to the pushbutton switch not being actuated, wherein a second difference exists between the predetermined amplitude the first one of the digital pulse signal received at the first terminal of the signal detector and the digital pulse signal received at the second terminal of the signal detector and the predetermined amplitude of the second different one of the digital pulse signal received at the first terminal of the signal detector and the digital pulse signal received at the second terminal of the signal detector responsive to the pushbutton switch being actuated, and wherein the output terminal of the signal detector generates an output signal having a first level and a second level, different from the first level, wherein the first level is generated responsive to the first difference causing the electronic system to remain in a low power consumption mode, and wherein the second level is generated responsive to the second difference causing the electronic system to transition from the low power consumption mode to a normal power consumption mode.

2. A wake-up circuit according to claim 1 wherein the signal detector further comprises:
   a comparator.

3. A wake-up circuit according to claim 1 wherein the first bias circuit further comprises:
   a first resistor divider circuit having a first resistor and a second resistor, wherein each of the first resistor and the second resistor of the first bias circuit have a first terminal and a second terminal, wherein the first terminal of the first resistor is electrically coupled to the power supply, wherein the second terminal of the first resistor is electrically coupled to the first terminal of the second resistor and electrically coupled to the first input terminal of the signal detector, and wherein the second terminal of the second resistor is electrically coupled to a ground potential.

4. A wake-up circuit according to claim 1 wherein the second bias circuit further comprises:
   a second resistor divider circuit having a third resistor and a fourth resistor, wherein each of the third resistor and the fourth resistor of the second bias circuit have a first terminal and a second terminal, wherein the first terminal of the third resistor is electrically coupled to the output terminal of the signal generator, wherein the second terminal of the third resistor is electrically coupled to the first terminal of the fourth resistor and electrically coupled to the second input terminal of the signal detector, and wherein the second terminal of the fourth resistor is electrically coupled to the ground potential.

5. A wake-up circuit according to claim 1 further comprising:
   a capacitor having a first terminal and a second terminal, wherein the first terminal is electrically coupled to the ground potential, wherein the second terminal is electrically coupled to the output terminal of the signal detector, wherein the capacitor is adapted to increase an amount of time that the second level of the output signal is present to provide a lengthened second level of the output signal, and wherein the lengthened second level of the output signal permits the electronic system to transition from the low power consumption mode to the normal power consumption mode.

6. A wake-up circuit for an electronic system, comprising:
   a signal generator having an output terminal and adapted to generate a digital pulse signal at the output terminal, wherein the digital pulse signal has a predetermined amplitude and a predetermined duration, wherein the output terminal of the signal generator is electrically coupled to a first terminal of a pushbutton switch having a second terminal electrically coupled to a ground potential;
   a comparator having a power supply terminal, a ground terminal, a first input terminal, a second input terminal and an output terminal, wherein the power supply terminal is adapted to receive power from a power supply, wherein the ground terminal is adapted to be electrically coupled to the ground potential, wherein each of the first input terminal and the second input terminal of the comparator are adapted to receive the digital pulse signal, wherein one of the first input terminal and the second input terminal of the comparator is electrically coupled to the first terminal of the pushbutton switch, and wherein the comparator further comprises:
   a first bias circuit electrically coupled to the first input terminal of the comparator and adapted to bias the digital pulse signal at a first predetermined direct current (DC) level, wherein the first bias circuit further includes:
      a first resistor divider circuit having a first resistor and a second resistor, wherein each of the first resistor and the second resistor of the first bias circuit have a first terminal and a second terminal, wherein the first terminal of the first resistor is electrically coupled to the power supply, wherein the second terminal of the first resistor is electrically coupled to the first terminal of the second resistor and electrically coupled to the first input terminal of the comparator,-and wherein the second terminal of the second resistor is electrically coupled to a ground potential; and
   a second bias circuit electrically coupled to the second input terminal of the comparator and adapted to bias the digital pulse signal at a second predetermined DC level different from the first predetermined DC level, wherein the second bias circuit further includes:
      a second resistor divider circuit having a third resistor and a fourth resistor, wherein each of the third resistor and the fourth resistor of the second bias circuit have a first terminal and a second terminal, wherein the first terminal of the third resistor is electrically coupled to the output terminal of the signal generator, wherein the second terminal of the third resistor is electrically coupled to the first terminal of the fourth resistor and electrically coupled to the second input terminal of the comparator, and wherein the second terminal of the fourth resistor is electrically coupled to the ground potential,
   wherein a DC difference between the first predetermined DC level and the second predetermined DC level is less than the predetermined amplitude of the digital pulse signal electrically coupled to the one of the first input terminal and the second input terminal of the comparator that is not electrically coupled to the first terminal of the pushbutton switch,
   wherein a first difference exists between the predetermined amplitude a first one of the digital pulse signal received at the first terminal of the comparator and the digital pulse signal received at the second terminal of the signal detector and the predetermined amplitude of a second different one of the digital pulse signal received at the first terminal of the signal detector and the digital pulse signal received at the second terminal of the comparator responsive to the pushbutton switch not being actuated,
   wherein a second difference exists between the predetermined amplitude the first one of the digital pulse signal received at the first terminal of the comparator and the digital pulse signal received at the second terminal of the signal detector and the predetermined amplitude of the second different one of the digital pulse signal received at the first terminal of the signal detector and the digital pulse signal received at the second terminal of the comparator responsive to the pushbutton switch being actuated, and
   wherein the output terminal of the comparator generates an output signal having a first level and a second level, different from the first level, wherein the first level is generated responsive to the first difference causing the electronic system to remain in a low power consumption mode, and wherein the second level is generated responsive to the second difference causing the electronic system to transition from the low power consumption mode to a normal power consumption mode.

7. A wake-up circuit according to claim 1 further comprising:
a capacitor having a first terminal and a second terminal, wherein the first terminal is electrically coupled to the ground potential, wherein the second terminal is electrically coupled to the output terminal of the comparator, wherein the capacitor is adapted to increase an amount of time that the second level of the output signal is present to provide a lengthened second level of the output signal, and wherein the lengthened second level of the output signal permits the electronic system to transition from the low power consumption mode to the normal power consumption mode.

8. A telematics control unit for a telematics communications system, comprising:
a standby mode power supply electrically coupled to a battery and adapted to operate in a low power consumption mode;
a normal mode power supply electrically coupled to the battery and adapted to operate in a normal power consumption mode; and
a wake-up circuit including:
a signal generator having an output terminal and adapted to generate a digital pulse signal at the output terminal, wherein the digital pulse signal has a predetermined amplitude and a predetermined duration, wherein the output terminal of the signal generator is electrically coupled to a first terminal of a pushbutton switch having a second terminal electrically coupled to a ground potential;
a signal detector having a power supply terminal, a ground terminal, a first input terminal, a second input terminal and an output terminal, wherein the power supply terminal is adapted to receive power from a power supply, wherein the ground terminal is adapted to be electrically coupled to the ground potential, wherein each of the first input terminal and the second input terminal of the signal detector are adapted to receive the digital pulse signal, wherein one of the first input terminal and the second input terminal of the signal detector is electrically coupled to the first terminal of the pushbutton switch, and wherein the signal detector further comprises:
a first bias circuit electrically coupled to the first input terminal of the signal detector and adapted to bias the digital pulse signal at a first predetermined direct current (DC) level; and
a second bias circuit electrically coupled to the second input terminal of the signal detector and adapted to bias the digital pulse signal at a second predetermined DC level different from the first predetermined DC level,
wherein a DC difference between the first predetermined DC level and the second predetermined DC level is less than the predetermined amplitude of the digital pulse signal electrically coupled to the one of the first input terminal and the second input terminal of the signal detector that is not electrically coupled to the first terminal of the pushbutton switch,
wherein a first difference exists between the predetermined amplitude a first one of the digital pulse signal received at the first terminal of the signal detector and the digital pulse signal received at the second terminal of the signal detector and the predetermined amplitude of a second different one of the digital pulse signal received at the first terminal of the signal detector and the digital pulse signal received at the second terminal of the signal detector responsive to the pushbutton switch not being actuated,
wherein a second difference exists between the predetermined amplitude the first one of the digital pulse signal received at the first terminal of the signal detector and the digital pulse signal received at the second terminal of the signal detector and the predetermined amplitude of the second different one of the digital pulse signal received at the first terminal of the signal detector and the digital pulse signal received at the second terminal of the signal detector responsive to the pushbutton switch being actuated, and
wherein the output terminal of the signal detector generates an output signal having a first level and a second level, different from the first level, wherein the first level is generated responsive to the first difference causing the electronic system to remain in a low power consumption mode, and wherein the second level is generated responsive to the second difference causing the telematics communication system to transition from the low power consumption mode to a normal power consumption mode.

9. A telematics control unit according to claim 8 wherein the signal detector further comprises:
a comparator.

10. A telematics control unit according to claim 8 wherein the first bias circuit in the wake-up circuit further comprises:
a first resistor divider circuit having a first resistor and a second resistor, wherein each of the first resistor and the second resistor of the first bias circuit have a first terminal and a second terminal, wherein the first terminal of the first resistor is electrically coupled to the power supply, wherein the second terminal of the first resistor is electrically coupled to the first terminal of the second resistor and electrically coupled to the first input terminal of the signal detector, and wherein the second terminal of the second resistor is electrically coupled to a ground potential.

11. A telematics control unit according to claim 8 wherein the second bias circuit in the wake-up circuit further comprises:
a second resistor divider circuit having a third resistor and a fourth resistor, wherein each of the third resistor and the fourth resistor of the second bias circuit have a first terminal and a second terminal, wherein the first terminal of the third resistor is electrically coupled to the output terminal of the signal generator, wherein the second terminal of the third resistor is electrically coupled to the first terminal of the fourth resistor and electrically coupled to the second input terminal of the signal detector, and wherein the second terminal of the fourth resistor is electrically coupled to the ground potential.

12. A telematics control unit according to claim 8 wherein the wake-up circuit further comprises:
a capacitor having a first terminal and a second terminal, wherein the first terminal is electrically coupled to the ground potential, wherein the second terminal is electrically coupled to the output terminal of the signal detector, wherein the capacitor is adapted to increase an amount of time that the second level of the output signal is present to provide a lengthened second level of the output signal, and wherein the lengthened second level of the output signal permits the telematics communication system to transition from the low power consumption mode to the normal power consumption mode.

13. A telematics communication system comprising:
   a telematics control unit including:
      a standby mode power supply electrically coupled to a battery and adapted to operate in a low power consumption mode;
      a normal mode power supply electrically coupled to the battery and adapted to operate in a normal power consumption mode;
      a signal generator having an output terminal and adapted to generate a digital pulse signal at the output terminal, wherein the digital pulse signal has a predetermined amplitude and a predetermined duration;
   a wire having a predetermined length and including a first end and a second end, wherein the end of the first wire is electrically coupled to the output terminal of the signal generator and adapted to receive and carry the digital pulse signal; and
   a pushbutton switch assembly including:
      a pushbutton switch having a first terminal and a second terminal, wherein the terminal of the first pushbutton switch is electrically coupled to a ground potential, and wherein the second terminal of the pushbutton switch is electrically coupled to the second end of the wire to receive the digital pulse signal from the output terminal of the signal generator; and
      a resistor having a first terminal and a second terminal, wherein the first terminal of the resistor is electrically coupled to the ground potential, wherein the second terminal of the resistor is electrically coupled to the second terminal of the pushbutton switch;
   wherein the telematics control unit further includes:
      a wake-up circuit including:
         a signal detector having a power supply terminal, a ground terminal, a first input terminal, a second input terminal and an output terminal, wherein the power supply terminal is adapted to receive power from a power supply, wherein the ground terminal is adapted to be electrically coupled to the ground potential, wherein each of the first input terminal and the second input terminal of the signal detector are adapted to receive the digital pulse signal, wherein one of the first input terminal and the second input terminal of the signal detector is electrically coupled to the first terminal of the pushbutton switch, and wherein the signal detector further comprises:
            a first bias circuit electrically coupled to the first input terminal of the signal detector and adapted to bias the digital pulse signal at a first predetermined direct current (DC) level; and
            a second bias circuit electrically coupled to the second input terminal of the signal detector and adapted to bias the digital pulse signal at a second predetermined DC level different from the first predetermined DC level,
         wherein a DC difference between the first predetermined DC level and the second predetermined DC level is less than the predetermined amplitude of the digital pulse signal electrically coupled to the one of the first input terminal and the second input terminal of the signal detector that is not electrically coupled to the first terminal of the pushbutton switch,
         wherein a first difference exists between the predetermined amplitude a first one of the digital pulse signal received at the first terminal of the signal detector and the digital pulse signal received at the second terminal of the signal detector and the predetermined amplitude of a second different one of the digital pulse signal received at the first terminal of the signal detector and the digital pulse signal received at the second terminal of the signal detector responsive to the pushbutton switch not being actuated,
         wherein a second difference exists between the predetermined amplitude the first one of the digital pulse signal received at the first terminal of the signal detector and the digital pulse signal received at the second terminal of the signal detector and the predetermined amplitude of the second different one of the digital pulse signal received at the first terminal of the signal detector and the digital pulse signal received at the second terminal of the signal detector responsive to the pushbutton switch being actuated, and
         wherein the output terminal of the signal detector generates an output signal having a first level and a second level, different from the first level, wherein the first level is generated responsive to the first difference causing the electronic system to remain in a low power consumption mode, and wherein the second level is generated responsive to the second difference causing the telematics communication system to transition from the low power consumption mode to a normal power consumption mode.

14. A telematics communication system according to claim 13 wherein the signal detector in the wake-up circuit further comprises:
   a comparator.

15. A telematics communication system according to claim 13 wherein the first bias circuit in the wake-up circuit further comprises:
   a first resistor divider circuit having a first resistor and a second resistor, wherein each of the first resistor and the second resistor of the first bias circuit have a first terminal and a second terminal, wherein the first terminal of the first resistor is electrically coupled to the power supply, wherein the second terminal of the first resistor is electrically coupled to the first terminal of the second resistor and electrically coupled to the first input terminal of the signal detector, and wherein the second terminal of the second resistor is electrically coupled to a ground potential.

16. A telematics communication system according to claim 13 wherein the second bias circuit in the wake-up circuit further comprises:
   a second resistor divider circuit having a third resistor and a fourth resistor, wherein each of the third resistor and the fourth resistor of the second bias circuit have a first terminal and a second terminal, wherein the first terminal of the third resistor is electrically coupled to the output terminal of the signal generator, wherein the second terminal of the third resistor is electrically coupled to the first terminal of the fourth resistor and electrically coupled to the second input terminal of the signal detector, and wherein the second terminal of the fourth resistor is electrically coupled to the ground potential.

17. A telematics communication system according to claim 13 wherein the wake-up circuit further comprises:

a capacitor having a first terminal and a second terminal, wherein the first terminal is electrically coupled to the ground potential, wherein the second terminal is electrically coupled to the output terminal of the signal detector, wherein the capacitor is adapted to increase an amount of time that the second level of the output signal is present to provide a lengthened second level of the output signal, and wherein the lengthened second level of the output signal permits the telematics communication system to transition from the low power consumption mode to the normal power consumption mode.

18. A method for waking up an electronic system from a low power consumption mode to a normal power consumption mode, the method comprising the steps of:

determining that the electronic system is in the low power consumption mode;

generating a digital pulse signal having a predetermined amplitude and a predetermined duration responsive to the step of determining that the electronic system is in the low power consumption mode;

receiving the digital pulse signal by a pushbutton switch;

monitoring the digital pulse signal to determine whether the pushbutton switch is actuated or is not actuated, further including the steps of:

biasing the digital pulse signal at a first predetermined direct current (DC) level;

biasing the digital pulse signal at a second predetermined DC level different from the first predetermined DC level, wherein a DC difference between the first predetermined DC level and the second predetermined DC level is less than the predetermined amplitude of the digital pulse signal having one of the first predetermined DC level and the second predetermined DC level that is not electrically coupled to the pushbutton switch;

determining that a first difference exists between the predetermined amplitude of a first one of the digital pulse signal biased at the first DC level and the digital pulse signal biased at the second DC level and the predetermined amplitude of a second different one of the digital pulse signal biased at the first DC level and the digital pulse signal biased at the second DC level responsive to the pushbutton switch not being actuated; and determining that a second difference exists between the predetermined amplitude the first one of the digital pulse signal biased at the first DC level and the digital pulse signal biased at the second DC level and the predetermined amplitude of a second different one of the digital pulse signal biased at the first DC level and the digital pulse signal biased at the second DC level responsive to the pushbutton switch being actuated, maintaining the low power consumption mode responsive to the step of determining that the first difference exists when the pushbutton switch is not actuated; and enabling the normal power consumption mode responsive to the step of determining that the second difference exists when the pushbutton switch is actuated.

* * * * *